A. D. COWDEN.
SCHEDULE FOR TRAINS, TICKET RATES, AND TIME TABLES.
APPLICATION FILED SEPT. 25, 1911.

1,065,591.

Patented June 24, 1913.
8 SHEETS—SHEET 1.

Fig. 1.

Witnesses

A. D. Cowden Inventor.
by C. A. Snow & Co.
Attorneys

A. D. COWDEN.
SCHEDULE FOR TRAINS, TICKET RATES, AND TIME TABLES.
APPLICATION FILED SEPT. 25, 1911.

1,065,591. Patented June 24, 1913.

Index to Cowden Train Chart of Stockton Division of S.P.R.R.

Number opposite name of station shows the Section of chart, the same number representing number of time table as well as section of Division map.

| | | | | | | | |
|---|---|---|---|---|---|---|---|
| Acampo | 4 | Floyd | 6 | Morrano | 7 | | |
| Agatha | 6 | Forest Lake | 4 | Muscatel | 9 | | |
| Amsterdam | 15 | French Camp | 2 | Nairn | 13 | | |
| Arena | 7 | Fresno | Chart | Need | 5 | | |
| Armbrust | 3 | Galt | Chart | Nevil | 6 | | |
| Armstrong | 3 | Graham | 5 | Newman | 6 | | |
| Arno | 5 | Gustine | 6 | Norval | 15 | | |
| Arundel | 14 | Hally | 6 | Oakdale | Chart | | |
| Athlone | 8 | Helisma | 15 | Oxalis | 6 | | |
| Atwater | 7 | Herbert | 17 | Patterson | 6 | | |
| Banta | 1 | Herndon | 9 | Peters | Chart | | |
| Berneda | Chart | Hickman | 13 | Polk | 5 | | |
| Borden | 9 | Holden | 10 | Pratton | 6 | | |
| Brighton | 5 | Ingomar | 6 | Raymond | Chart | | |
| Buhach | 7 | Irrigosa | 9 | Ripon | 7 | | |
| Burnett | 12 | Ione | Chart | Rolinda | 6 | | |
| Califa | 8 | Jamesan | 6 | Ryer | 13 | | |
| Carbondale | 16 | Jarn | 3 | Sacramento | Chart | | |
| Castle | 3 | Jesbel | 17 | Salida | 7 | | |
| Ceres | 7 | Kearney | 6 | Sierra Vista | 8 | | |
| Charleston | 10 | Kerman | 6 | Stockton | Chart | | |
| Cicero | 16 | Keyes | 7 | Talbot | 17 | | |
| Claribel | 13 | Knowles | 17 | Thalheim | 12 | | |
| Clarksona | 16 | Lathrop | Chart | Timba | 6 | | |
| Clay | 16 | Lingard | 8 | Tracy | Chart | | |
| Clements | 15 | Linora | 6 7 | Trigo | 12 | | |
| Cometa | 12 | Livingston | 7 | Turlock | 7 | | |
| Conley | 16 | Lockeford | 15 | Urgon | 4 | | |
| Cromir | 6 | Lodi | Chart | Valley Springs | Chart | | |
| Crows Landing | 6 | Los Banos | 6 | Vernalis | 6 | | |
| Dagon | 16 | Lyoth | 6 | Victor | 15 | | |
| Daulton | 17 | Madera | 9 | Volta | 6 | | |
| Day | 17 | Manteca | 7 | Wallace | 15 | | |
| Delhi | 7 | McConnell | 5 | Walthall | 10 | | |
| Dos Palos | 6 | McNear | 8 | Waterford | 13 | | |
| Elk Grove | 5 | Mendota | 6 | Waverly | 11 | | |
| El Pinal | 3 | Merced | 15 | Westley | 6 | | |
| El Reposa | 12 | Milton | Chart | Windsor | 10 | | |
| Farmington | 12 | Minturn | 8 | Woodbridge | Chart | | |
| Firebaugh | 6 | Modesto | 7 | Yarmouth | 6 | | |
| Florin | 5 | Montpellier | 13 | Yaru | 16 | | |

*Fig. 2.*

Witnesses

A.D. Cowden
Inventor,
by
Attorneys.

A. D. COWDEN.
SCHEDULE FOR TRAINS, TICKET RATES, AND TIME TABLES.
APPLICATION FILED SEPT. 25, 1911.

1,065,591.

Patented June 24, 1913.
8 SHEETS—SHEET 3.

Fig. 3.

Witnesses

A. D. Cowden, Inventor,
by C. A. Snow & Co.
Attorneys.

A. D. COWDEN.
SCHEDULE FOR TRAINS, TICKET RATES, AND TIME TABLES.
APPLICATION FILED SEPT. 25, 1911.

1,065,591.  Patented June 24, 1913.

Fig. 4.

Witnesses

A. D. Cowden
Inventor,
by C. A. Snow & Co.
Attorneys

A. D. COWDEN.
SCHEDULE FOR TRAINS, TICKET RATES, AND TIME TABLES.
APPLICATION FILED SEPT. 25, 1911.

1,065,591. Patented June 24, 1913.
8 SHEETS—SHEET 5.

Index to Cowden train chart-time table Stockton Division of S. P. R. R. Co.

```
Acampo     4 R3  L6  32  37  82  121 122 124 137 138
Banta      1 R3  L8  7F  31F 121F 122 124 135F 136F
Carbondale 16 R21 L6  131 132 313F 314F
Dagon      16 R26 L1  All flag
Floyd      6 R114 L12 35F 36F 85F
Herndon    9 R19 L10 49F 50F 86F 193F 194F
Keyes      7 R28 L30 49F 50F 87F 193F 194F
Merced     X 7-8 All stop
Ripon      7 R10 L47 7  8  49 50 86F 87F 193 194
Sacramento X End Sec. 5 All stop
Waterford  13 R30 L10 All stop
```

*Fig. 5.*

Average Speed per hour of all trains shown on this chart.
No. 3      31
No. 7      32
No. 8      30
No. 10     31
No. 25     45

*Fig. 6.*

This table may be used to approximate time
of trains at intermediate stations

| | Speed per hour | | | | | |
|---|---|---|---|---|---|---|
| | 15 | 20 | | 40 | 45 | 50 |
| Miles 5 | 20m | 15m | | 7m | 6m | 5m |
| 10 | 40m | 30m | | 15m | 13m | 10m |
| 15 | 1hr | 45m | | 22m | 20m | 15m |
| 20 | 1hr20m | 1hr | | 30m | 27m | 20m |
| 25 | 1hr40m | 1hr15m | | 37m | 33m | 25m |
| 30 | 2hrs | 1hr30m | | 45m | 40m | 30m |
| 35 | 2hr20m | 1hr45m | | 52m | 47m | 35m |
| 40 | 2hr40m | 2hrs | | 1hr | 53m | 40m |
| 45 | 3hrs | 2hrs15m | | 1hr7m | 1hr | 45m |
| 50 | 3hr20m | 2hrs30m | | 1hr15m | 1hr3m | 50m |

*Fig. 7.*

Witnesses

A. D. Cowden
Inventor,
by C. A. Snow & Co.
Attorneys

A. D. COWDEN.
SCHEDULE FOR TRAINS, TICKET RATES, AND TIME TABLES.
APPLICATION FILED SEPT. 25, 1911.

Patented June 24, 1913.

BASING POINTS

| | | |
|---|---|---|
| 1 | Tracy | $1.85 |
| 2 | Lathrop | 1.55 |
| 3 | Stockton | 1.25 |
| 4 | Lodi | 1.60 |
| 5 | Galt | 1.90 |
| 6 | Sacramento | 2.70 |
| 7 | Peters | 1.05 |
| 8 | Merced | .95 |
| 9 | Berenda | 1.75 |
| 10 | Fresno | 2.60 |

From Waterford.

| | | |
|---|---|---|
| Agatha | $2.00-1 | $1.85-10 |
| Amsterdam | 1.65-7 | .35-8 |
| Banta | $ .20-1 | $ .25-2 |
| Berenda | .80-8 | .90-10 |
| Califa | $ .65-8 | $1.05-10 |
| Calla | .20-2 | 1.55-8 |
| Dagon | $1.05-5 | |
| Delhi | 1.20-2 | $ .60-8 |
| Elk Grove | $ .35-5 | $ .50-6 |
| El-Pinal | .10-3 | .35-4 |
| Farmington | $ .15-7 | $1.80-8 |
| Fergus | 1.65-2 | .15-8 |
| Gustine | $1.25-1 | $2.55-10 |
| Helisma | $ .95-4 | |
| Hickman | 1.10-7 | .90-8 |
| Ingomar | $1.45-1 | $2.40-10 |
| Ione | 1.10-5 | |
| Jamesan | $3.20-1 | $ .75-10 |

| | | |
|---|---|---|
| Kerman | $3.50-1 | $ .50-10 |
| Keyes | .85-2 | .30-8 |
| McConnell | $ .25-5 | $ .60-6 |
| McNear | .55-8 | 1.15-10 |
| Lingard | $ .20-8 | $1.50-10 |
| Linora | 1.35-1 | 2.45-10 |
| Nairn | $1.65-7 | $ .20-8 |
| Newman | 1.15-1 | 2.70-10 |
| Oakdale | $ .70-7 | $1.25-8 |
| Oxalis | 2.35-1 | 1.50-1 |
| Patterson | $ .80-1 | $3.05-10 |
| Pratton | 3.65-1 | .20-10 |
| Ripon | $ .35-2 | $1.45-8 |
| Rolinda | 3.50-1 | .30-10 |
| Salida | $ .40-2 | $1.35-8 |
| San Joaquin Bdge. | .25-1 | .15-2 |
| Trigo | $ .25-7 | $1.65-8 |
| Turlock | 1.00-2 | .75-8 |
| Valley Springs | $1.10-4 | |
| Vernalis | .35-1 | $3.50-10 |
| Wallace | $ .70-4 | |
| Walthall | .25-3 | $ .20-7 |
| Waverly | .25-7 | |
| Yarmouth | $ .20-1 | $3.65-10 |
| Yaru | .90-5 | |

*Fig. 11.*

A. D. Cowden, Inventor by C.A. Snow & Co.
Attorneys

Witnesses

UNITED STATES PATENT OFFICE.

ALBERT DELMER COWDEN, OF WATERFORD, CALIFORNIA.

SCHEDULE FOR TRAINS, TICKET-RATES, AND TIME-TABLES.

1,065,591.  Specification of Letters Patent.  Patented June 24, 1913.

Application filed September 25, 1911. Serial No. 651,248.

*To all whom it may concern:*

Be it known that I, ALBERT D. COWDEN, a citizen of the United States, residing at Waterford, in the county of Stanislaus and State of California, have invented a new and useful Schedule for Trains, Ticket-Rates, and Time-Tables, of which the following is a specification.

The present invention relates to an improved schedule for time tables for use upon railroads and the like, the primary object of this invention being the provision of a means whereby a chart is divided geographically into sequential ordered divisions, each of the said divisions having an identifying sign, that is either a number or letter or a combination thereof, a separate index alphabetically arranged according to the geographical names upon the chart and provided with signs such for instance as the above mentioned numbers or letters or the combination thereof to correspond to the sequential signs upon the chart, and a schedule for each of the divisions, that is where used at a time schedule for railroading, the departure and arrival of trains, having thereon the names of the geographical places, the number of the train, and the arriving and leaving time of the respective trains, the chart, index and the schedule as above set forth being so devised as to check one another, whereby the location of a place or train, when either one of the respective members of the method may be located through the assistance of either one of said members, that is, the chart, index and schedule being so arranged as to check one another.

A further object of this invention is the provision of a geographical chart, containing the railroads or other routes in a certain section of country, and so divided either numerically or alphabetically into sequential order, and combined with an alphabetical index of the geographical points upon said chart, so that a party desiring to go from one location to another, may locate such place either upon the chart or the index, and through the comparison of both will locate the respective train and number upon a train time schedule, whereby various connections may be accurately made, and at a glance the proper schedule for the particular trip, may be made instanter.

With the foregoing and other objects in view which will appear as the description proceeds, the invention resides in the combination and arrangement of parts and in the details of construction hereinafter described and claimed, it being understood that changes in the precise embodiment of invention herein disclosed may be made within the scope of what is claimed without departing from the spirit of the invention.

In the drawings Fig. 2 is an index arranged to read in conjunction with said map. Fig. 3 is a time schedule to be used in connection with the chart or map of Fig. 1 and the index as shown in Fig. 2.

Figure 1:
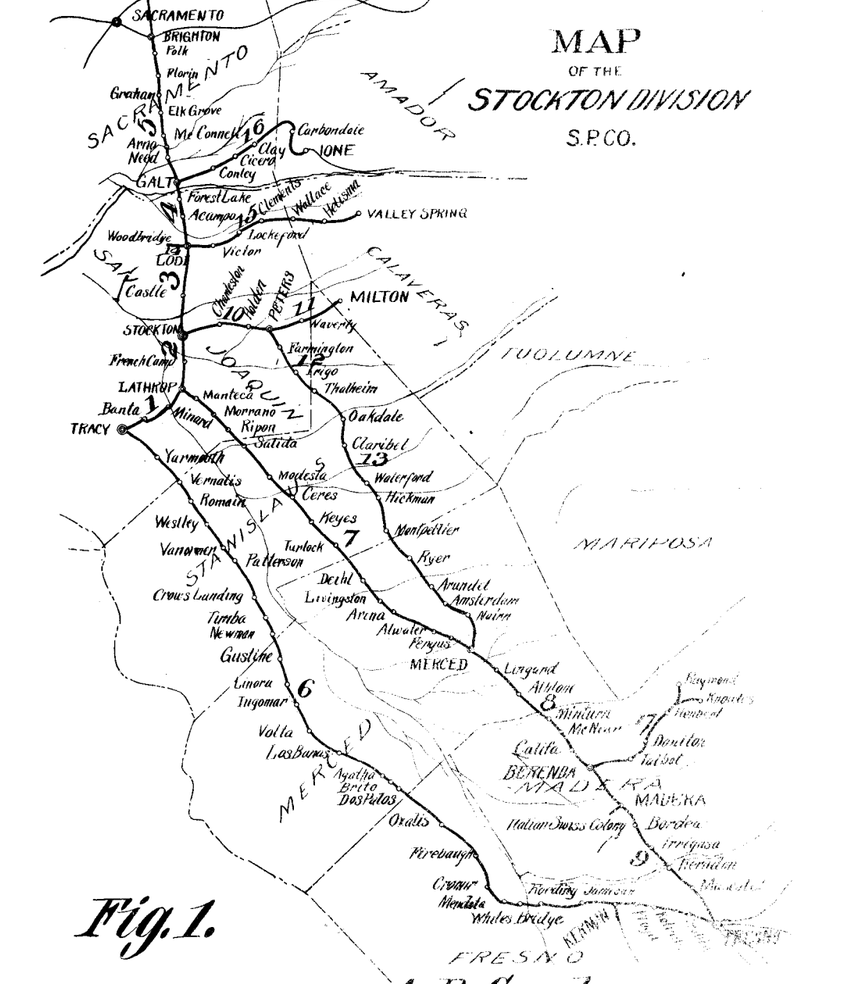
—Figure 1 is a map of the Stockton division of the Southern Pacific Railroad, divided according to the present invention.
Figure 4:
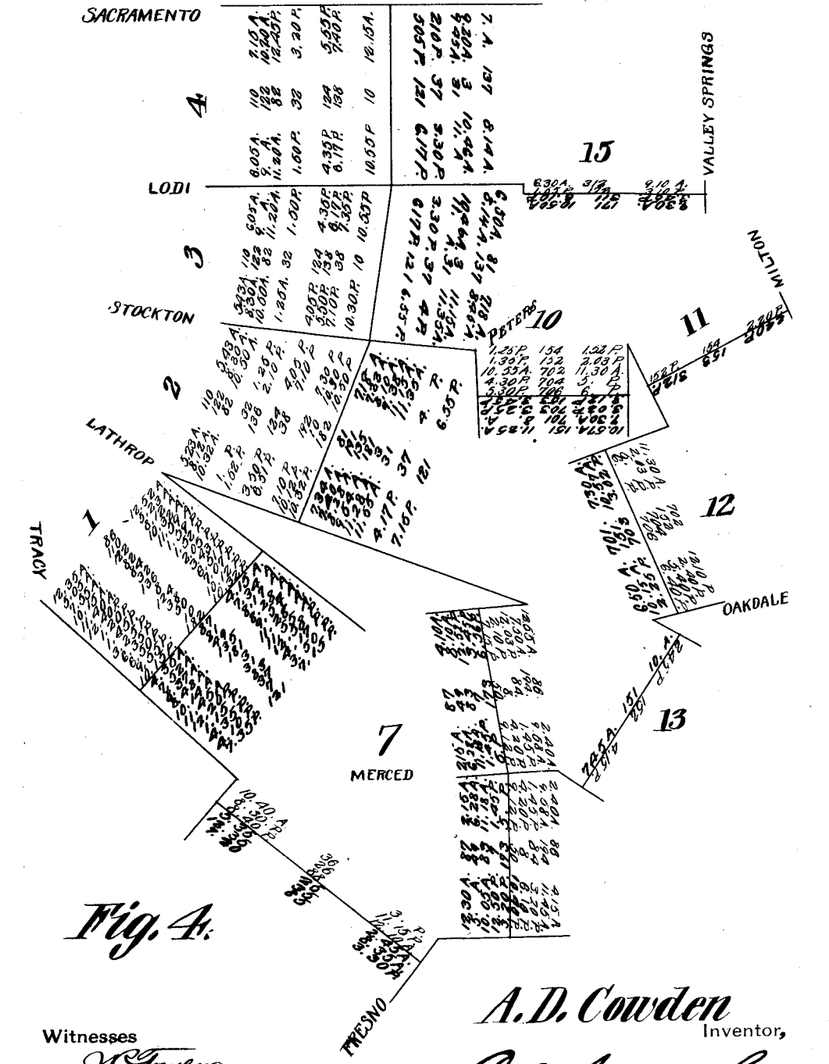
Fig. 4 illustrates the time schedule and division order as applied to a chart directly, as shown in Fig. 1.
Figure 9:
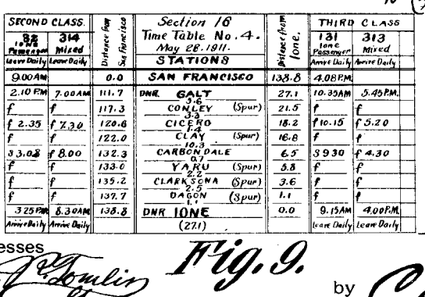
Fig. 9 is a time table to be used with Fig. 3, in connection with Figs. 1 and 2.

In carrying out this method, the chart as shown in Fig. 1, the index as shown in Fig. 2, and the time schedule as shown in either Figs. 3, 9 or 4 are employed, to check one another and indicate to a certainty the train arriving and leaving time, whereby the patron may locate at a glance the proper train and connection to carry him to the desired destination. To carry this into effect, the chart as shown in Fig. 1 is divided into seventeen divisions, and although the method is herein shown in connection with the small section of the country, known as the Stockton division, it is readily understood and appreciated, that this method may be applied to the whole country at large, or to various sections, and if so desired to the various divisions in a section of a railroad, a concrete example being herein given to more particularly set forth the advantages of the present invention. This chart or map as shown in Fig. 1 is divided geographically and has placed thereon the various stations and connections, names of the paralleling and branch railroad lines as indicated in heavy lines, while in Fig. 2 is shown the alphabetical list of the stations, with the numbers to the right hand side of each station indicating in which division of the chart in Fig. 1, the respective stations may be located.

In Fig. 3 is indicated the train schedule giving the train number in the central column the arriving time upon the left thereof and the leaving time upon the right thereof, the said schedule having displayed thereon the various trains moving in the direction, that is what is known as east and west of the various divisions to correspond to the divisions as shown upon the chart in Fig. 1. In order to designate the difference between the trains going east and the trains going west, the trains going west are indicated in black ink, while those going east, are indicated in red ink, thus denoting at a glance, and preventing confusion, the direction so that the patron may locate in an instant the train in the desired direction, and thus provide a single schedule for both outgoing and incoming trains and trains going in the opposite directions, and dispensing with the cumbersome schedules as now used, wherein all western trains are located on a single sheet, or sheets, while the eastern trains are located on an entirely different sheet.

Where the word "Chart" appears in Fig. 2, reference is made to the division or terminal points on the schedule illustrated in Fig. 3, while those designated by numerals, indicate stations of minor importance.

In Fig. 4, as illustrated a train schedule as applied directly to the map or chart as shown in Fig. 1, using the same train schedule as shown in Fig. 3, but having the triangular lines designating the points of connection or where the patron must change cars or connect for the desired point. In this particular instance, it will be noted that they are at Peters in division 10, Oakdale in division 12, Lathrop in division 2, and that at a glance the various desired trains may be indicated as will presently appear. It will thus be seen that the map as shown in Fig. 1 shows the three routes from Tracy, to Fresno, the said routes being first Tracy to Fresno without the necessity of passing any junction points, this particular route being shown along the lower part of the map; second, Tracy through Lathrop to Fresno, and third, from Tracy through Lathrop over to Stockton, going down to the lower part of the Stockton line to Peters, and through Oakdale and Merced to Fresno.

Figure 5:
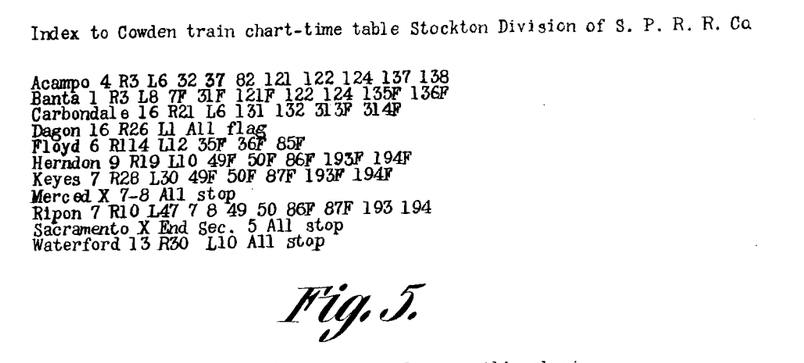
Fig. 5 is a fragmentary view of a portion of an index used in connection with a modification.
Figure 6:
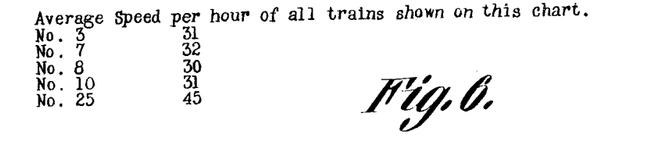
Fig. 6 is a fragmentary view of a chart to designate the average speed per hour, of trains to be within the index of Fig. 5.
Figure 7:
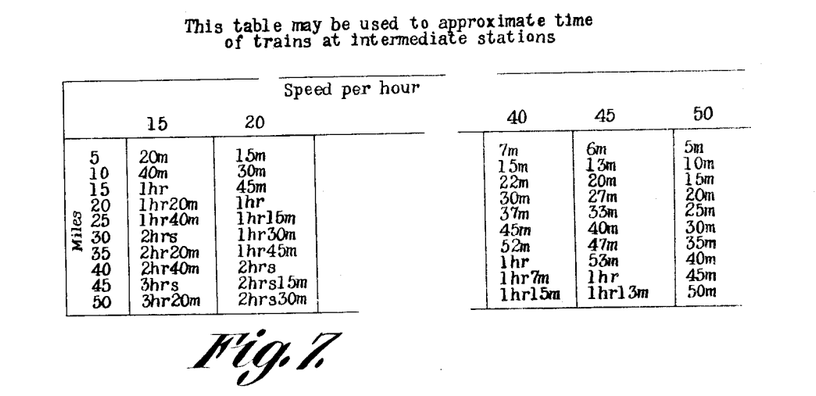
Fig. 7 is a fragmentary view of a table used to approximate the time of the trains at intermediate stations and to be used in connection with Figs. 5 and 6.

In order to give a concrete example of the operation of the present method of scheduling, should the patron desire or happen to be upon train No. 152, it will be seen by reference to Fig. 3, that this train continues through Oakdale to Merced, arriving there at 4.15 p. m., connecting with train No. 8, leaving Merced for Fresno at 4.20 p. m. The time schedule (Fig. 3) shows the junction points through which the trains pass, the time of arrival and departure of all trains coming and going in both directions, and also indicates whether the patron should change trains, for it is often the case that it is impossible to reach the destination on the same train number according to the schedule, and by this method there will be no difficulty in ascertaining when and where the change is to be made. For example, suppose the patron at Tracy desires to go to Carbondale, which is not shown on the map, the patron simply examines the index of chart Fig. 2, which cites them to section 16 of the map, and with a comparatively small amount of searching it will be located as on the Ione branch, at the upper right hand part of the map, Fig. 1. Thus it will be seen by examining schedule, Fig. 3, that train No. 32 leaves Galt in divisions 4 and 5, at 2.10 p. m., and that train 32 arrives in Galt from Tracy at 2.10 p. m., making connection for Carbondale, Ione division, No. 16, Fig. 3, and should the patron desire to know the exact time of arrival at Carbondale, which is between Galt and Ione, it is simply necessary to turn to the schedule, section 16, Fig. 9, where it will be seen at a glance that the train arrives at Carbondale at 3.08 p. m. The indication that the train 32 makes connection for Carbondale is shown at the upper left hand corner of the schedule as shown in Fig. 9, that train 32 is indicated, and as such train 32 above described, arrives in Galt from Tracy at 2.10 p. m., and leaves Galt in divisions 4 and 5 at 2.10 p. m., it is evident that connection is made for Carbondale in the Ione division. Where the method is applied to a great area, it may be necessary to resort to the indexing in the manner that would indicate to the patrons the division number and the number of miles to the right or left of the connecting end or terminal of the railroad, that is as shown in Figs. 5, 6 and 7 where the index might be employed as follows: Waterford 13 R 30 L 10, which would indicate that Waterford was located within section 13 a distance of 30 miles reading toward the right and ten miles inside the section reading toward the left. In this connection there would be a numerical list of the trains shown on each chart giving the average running speed, and also a table to show the time required for the different trains to cover the respective distance the said list being included for an average running time, say 20 to 60 miles per hour, and by this means, the patrons could ascertain within a very few minutes the arrival time of the train at the desired destination, which may not be placed upon the chart.

Figure 8:
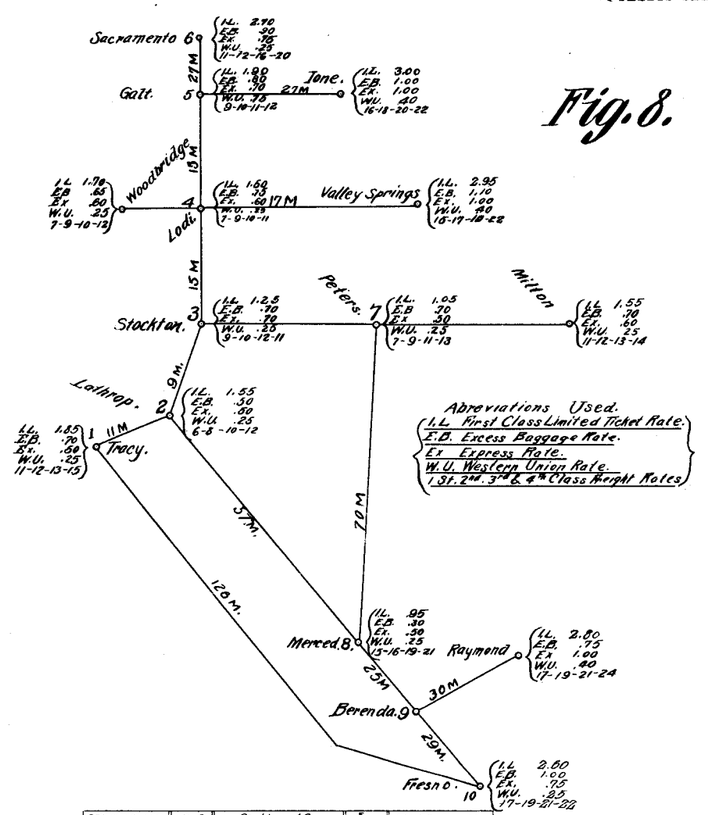
Fig. 8 is a similar chart to Fig. 4, demonstrating its use for ticket rating.

By referring to the manner of indexing as shown in Figs. 5 and 8 it is readily seen that by using figures to represent amounts in dollars and cents instead of miles, as in the time table, the ticket fare can be readily ascertained upon the nearest junction to the right or left as desired. The fare from the station using the chart would be figured as heretofore described and shown on the chart at each junction point via the various routes to said junction, all that would be necessary to make this chart practical for amounts would be to add the amount shown in the index. It can also be handled to advantage by using the map as per Fig. 1 giving only the junction points and the fare to each said junction being shown on the map near the name of the station. By providing this means of ascertaining the fares the cumbersome books which are now employed and which are very complicated, could be dispensed with, it being simply necessary to provide a printed chart which could be displayed in a convenient place for the use of the railroad agents or ticket agents.

Figure 10:
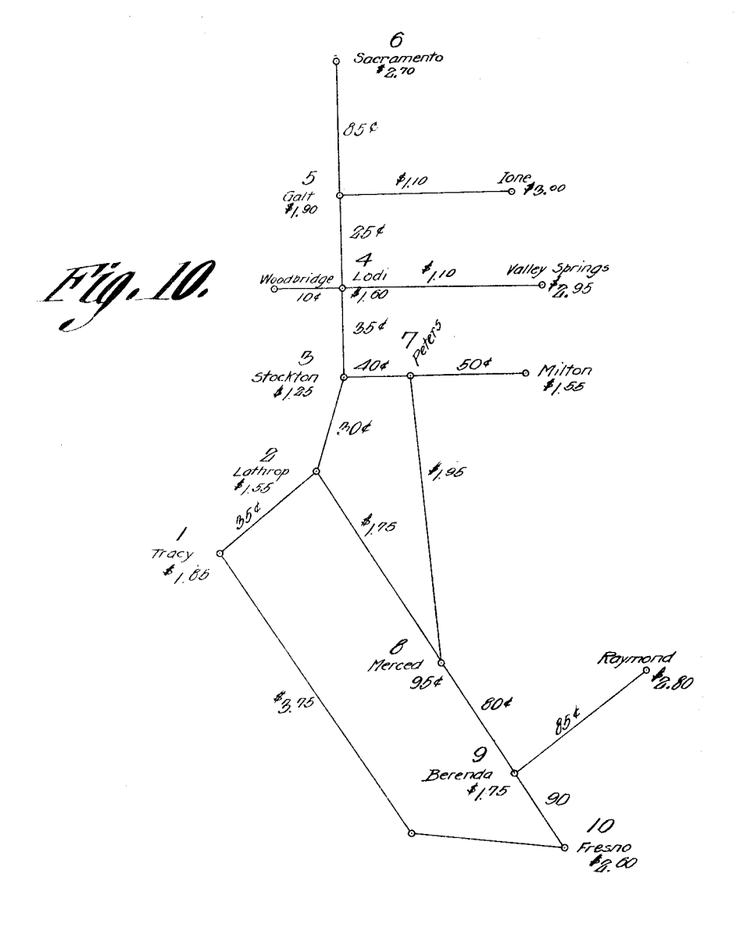
Fig. 10 illustrates a simple method of ticket rating being a chart somewhat similar to that shown in Fig. 8.
Figure 11:
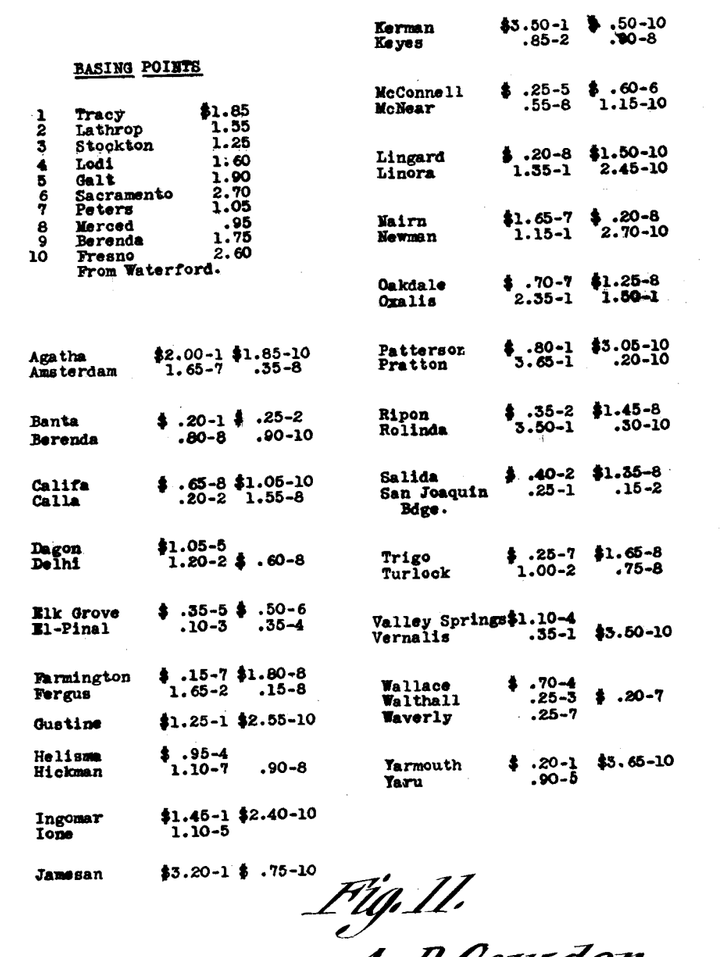
Fig. 11 is a chart giving the basing points and an alphabetical list of certain of the stations in the division as illustrated in Fig. 10, and to be used in connection therewith and also with Fig. 1.

By reference to Figs. 10 and 11, wherein is shown a detail system for rate sheets covering the Stockton division of the Southern Pacific Railway Co., it can be readily seen that the system herein outlined will enable a ticket clerk to find the desired rate via any route, as for instance if the agent at Lathrop desired to find the rate to Waverly via Merced and Peters, it is simply necessary for him to refer to the index in Fig. 11 and find "Waverly," where it will be shown that $0.25-7 indicates 25 cents is to be added to the totals at junction No. 7. In this case it is not necessary to use the basing rate to Peters, but only to refer to the map, Fig. 10, where the rates are shown from one junction to the other, and where it will be seen at a glance that the rate from Lathrop to Merced is $1.75, and Merced to Peters $1.95, these amounts being added together with the addition of 25 cents as per the index gives the complete fare to Waverly via Merced and Peters or $3.95. Under the system now in use a number of sheets have to be examined before this rate can be found, and a great amount of time is lost, whereas with the present system it is only a question of a few seconds. By this means it will be seen that the chart or map shown in Fig. 1 can be used in connection with the index of Fig. 11 and the chart in Fig. 10 and that one will check the other. It will also be noted that this particular system may be applied to any official time table of any division of railroad without interfering in any way with the purpose for which it was originally intended, namely, the running and operation of trains. In this case the time table is merely divided into sections to agree with the map and chart. This may be done by marginal figures giving the various sections the same number as on the chart and map.

What is claimed is:

1. A schedule for the purpose set forth, consisting of a chart divided geographically into sequential ordered divisions, each division having an identifying sign, an index alphabetically arranged according to the geographical names upon the chart and provided with signs identical with the sequential signs upon the chart, and a schedule for each division bearing the division identifying sign, said chart, index and schedule checking one another.

2. A schedule for the purpose set forth, consisting of a chart divided geographically into sequential ordered divisions, each division having an identifying sign, an index alphabetically arranged according to the geographical names upon the chart and provided with signs identical with the sequential signs upon the chart, and a schedule for each division bearing the division identifying sign and setting forth the starting and arriving times of trains and the respective trains numbers, said chart, index and schedules checking one another.

In testimony that I claim the foregoing as my own, I have hereto affixed my signature in the presence of two witnesses.

ALBERT DELMER COWDEN.

Witnesses:
C. C. HORSLEY,
J. BRADLEY.